(12) United States Patent
Khoramian

(10) Patent No.: US 8,453,449 B2
(45) Date of Patent: Jun. 4, 2013

(54) VERTICAL AXIS SOLAR POWERED GENERATOR

(76) Inventor: Mehrdad Issazadeh Khoramian, Beverly Hills, CA (US)

( * ) Notice: Subject to any disclaimer, the term of this patent is extended or adjusted under 35 U.S.C. 154(b) by 801 days.

(21) Appl. No.: 12/693,835

(22) Filed: Jan. 26, 2010

(65) Prior Publication Data

US 2011/0179789 A1 Jul. 28, 2011

(51) Int. Cl.
*B60K 16/00* (2006.01)
*H01L 25/00* (2006.01)

(52) U.S. Cl.
USPC ........ 60/641.8; 60/641.15; 136/248; 136/251

(58) Field of Classification Search
USPC ............... 60/641.8–641.15, 398; 136/244, 136/251, 248, 291; 290/44, 55; 310/10, 303
See application file for complete search history.

(56) References Cited

U.S. PATENT DOCUMENTS

| | | | |
|---|---|---|---|
| 4,143,522 A * | 3/1979 | Hamrick et al. | 62/324.1 |
| 5,395,070 A * | 3/1995 | Stirbl et al. | 244/2 |
| 6,966,523 B2 * | 11/2005 | Colting | 244/30 |
| 7,045,702 B2 * | 5/2006 | Kashyap | 136/244 |
| 7,147,438 B2 * | 12/2006 | DePaoli | 416/3 |
| 7,615,884 B2 * | 11/2009 | McMaster | 290/55 |

* cited by examiner

*Primary Examiner* — Hoang Nguyen

(74) *Attorney, Agent, or Firm* — Cohen I.P. Law Group P.C.; Michael N. Cohen

(57) ABSTRACT

An electrical power generation system comprises a vertical axis solar powered generator having a bottom side grounded and a top side connected to a vertical rotor shaft, a central rotating hub having a center connected to the vertical rotor shaft, a solar energy collecting and converting unit enclosed in a transparent dome mounted on a top side of the central rotating hub, and a plurality of rotating arms having a proximal end secured to the central rotating hub and a distal end connected to a dual-V roller bearing. The system further comprises an electric motor with a propeller mounted proximate to the distal end of rotating arms, a shroud attached to ground, and a pair of hollow tubes attached to the shroud. Solar energy collecting and converting unit provides electric energy to electric motor which turns the propeller and rotates the rotating arms thereby causing electric energy generation by generator.

10 Claims, 5 Drawing Sheets

VERTICAL AXIS SOLAR POWERED GENERATOR

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to an electrical power generation system, and more particularly to a system for generating electrical power using a solar powered generator.

DISCUSSION OF RELATED ART

Combustion of fossil fuels emits carbon and other pollutants into the air, increasing the amount of greenhouse gases emitted into the air and some illnesses in humans. This has prompted more and more people look for ways to build a solar power generator to help lessen the pollution and become aware on how the solar power generator can be immensely benefited to minimize the negative impacts of fossil fuels. The solar power generator allows people to get electricity from the heat of the sun without having to burn any fuels.

U.S. Pat. No. 4,229,941 issued to Hope provides a unitary system for generating energy from solar and wind energy sources. A solar collector collects solar rays, and these rays are focused by a parabolic mirror before being conducted through a fresnel tube to a container which minimizes thermal exchange with the exterior environment. The thermal energy of the rays within the container is converted to mechanical energy by a boiler and a steam-operated turbine. There is also a bladed wind rotor attached to the output shaft of the boiler to garner additional energy from the wind. The two separate assemblies, one for the parabolic mirror and the other for the solar boiler and wind rotor are connected through a fresnel tube that is used to transmit light from the parabolic assembly to the solar boiler. The inherently delicate design of the system requires a high degree of precision in manufacturing and is susceptible to damage by high winds.

Present solar generators employ solar panels that are connected to generate direct current (DC) electricity. For example, U.S. Pat. No. 4,096,698 issued to Martin discloses a solar energy converting device comprising a generally upright air channeling device for channeling air generally vertically from a lower level to an upper elevated level, a solar energy storage system that acts to collect and store solar energy, a turbine assembly rotatively mounted about an upper portion of the air channeling device and rotatively responsive to air moving through the air channeling device, and an electrical generation system operatively connected to the turbine assembly for converting mechanical energy associated with the driven assembly into electrical energy. In order to get sufficient efficiency from the conversion system, the rising air channeling device must be of very large height and cross sectional area. The material needed for such gigantic structure has been so large that the cost thereof has been prohibitive because of the resulting low cost-efficiency of the conversion systems. Further, a large sized solar collecting unit may be required to raise the air to the air channeling device.

An apparatus for collecting and concentrating solar radiation for the generation of electrical power has been disclosed in U.S. Pat. No. 6,067,982 issued to Harrison. The apparatus comprises a rotatable reflector dish which is pivoted to one side so as to be positioned between a vertical position or lowered to a horizontal position. These concentrating systems have the disadvantage that they have to be steered to follow the sun, which can be very complicated with large areas and such a system could not produce electricity depending on the electrical requirements at all the time.

U.S. Pat. No. 5,254,876 issued to Hickey provides a combination solar and wind powered generator including a wind generator mounted atop support tower, responsive to the flow of air currents, for converting mechanical energy into electrical energy. Likewise, U.S. Pat. No. 7,045,702 issued to Kashyap provides a solar-paneled windmill having aerodynamic fan blades provided with solar panels. The presence of tower increases the cost of construction and makes the design complex.

Therefore, there is a need for an electrical power generation system that has excellent conversion rates using a small sized solar energy collecting unit. Further, such a device would be economical and simple in design. Such a needed device would be environmentally friendly, reliable, and providing improved supply of electricity. The present invention accomplishes these objectives.

SUMMARY OF THE INVENTION

The present invention is an electrical power generation system. The system comprises a vertical axis solar powered generator having a bottom side grounded and a top side connected to a vertical rotor shaft, a central rotating hub in the shape of a circular flat plate having a center connected to the vertical rotor shaft, at least one solar energy collecting and converting unit enclosed in a transparent dome mounted on a top side of the central rotating hub, and a plurality of rotating arms having a proximal end secured to the central rotating hub and a distal end connected to at least one dual-V roller bearing.

Further, the present invention comprises an electric motor with a propeller mounted proximate to the distal end of each of the plurality of rotating arms, a circular shaped shroud attached to a ground, and a pair of circular shaped hollow tubes attached to the circular shaped shroud for providing guided support for the at least one dual-V roller bearing. The at least one solar energy collecting and converting unit provides an electric energy to the electric motor which may turn the propeller and rotate the plurality of rotating arms. Thus the rotation of the plurality of rotating arms causes the electric energy generation by the vertical axis solar powered generator.

With the use of transparent dome, the aerodynamic drag on the at least one solar energy collecting and converting unit due to the rotation of the central rotating hub can be reduced. The central rotating hub functions as a medium for transferring a torque from the plurality of rotating arms to the vertical rotor shaft. The vertical rotor shaft is aligned exactly with the center of the central rotating hub for the electric energy generation.

The at least one dual-V roller bearing rides on the pair of circular shaped hollow tubes thereby providing a support for the distal end of the plurality of rotating arms. Moreover with the arrangement, smooth rotational movement of the plurality of rotating arms can be achieved and load on the plurality of rotating arms can be reduced. The circular shaped shroud covers and provides protection for the electric motors, propellers, dual-V roller bearings, and pair of circular shaped hollow tubes from the environment. Therefore, the present system adds safety to the design, keeps the electric motors cool, and the surrounding clean.

DETAILED DESCRIPTION OF THE PREFERRED EMBODIMENT

Figure 1:
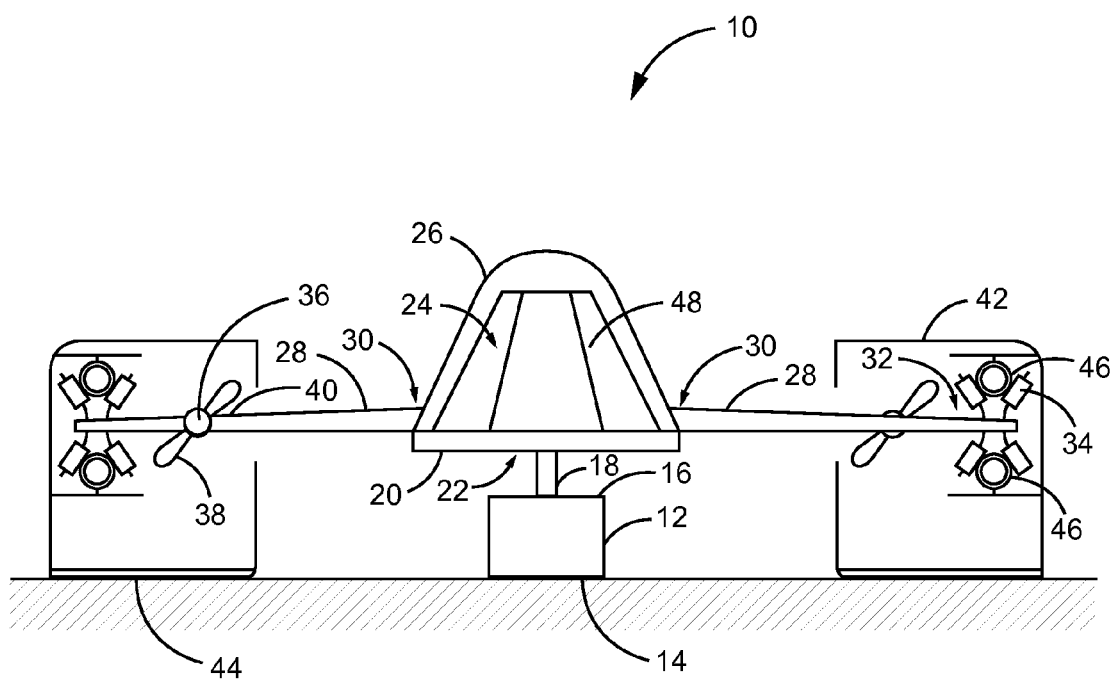
FIG. 1 is a side elevational view of an electrical power generation system of the present invention wherein a shroud is partially shown.

FIG. 1 shows a side elevational view of an electrical power generation system 10 according to the present invention. The system 10 comprises a vertical axis solar powered generator 12 having a bottom side 14 grounded and a top side 16 connected to a vertical rotor shaft 18, a central rotating hub 20 in the shape of a circular flat plate having a center 22 connected to the vertical rotor shaft 18, at least one solar energy collecting and converting unit 24 enclosed in a transparent dome 26 mounted on a top side of the central rotating hub (not shown), and a plurality of rotating arms 28 having a proximal end 30 secured to the central rotating hub 20 and a distal end 32 connected to at least one dual-V roller bearing 34.

The present invention further comprises an electric motor 36 with a propeller 38 mounted proximate to the distal end 40 of each of the plurality of rotating arms 28, a circular shaped shroud 42 attached to a ground 44, and a pair of circular shaped hollow tubes 46 attached to the circular shaped shroud 42 for providing guided support for the at least one dual-V roller bearing 34. The at least one solar energy collecting and converting unit 24 provides an electric energy to the electric motor 36 which may turn the propeller 38 and rotate the plurality of rotating arms 28. Thus the rotation of the plurality of rotating arms 28 causes the electric energy generation by the vertical axis solar powered generator 12.

The transparent dome 26 reduces the aerodynamic drag on the at least one solar energy collecting and converting unit 24 due to the rotation of the central rotating hub 20. The at least one solar energy collecting and converting unit 24 may comprise of a plurality of solar panels 48 which may be tilted for optimum solar energy collection. The positive and negative electrical leads from the plurality of solar panels are connected to form a parallel or series circuit or combination of the two, depending on the electrical requirements of the electrical motors 36. The central rotating hub 20 functions as a medium for transferring a torque from the plurality of rotating arms 28 to the vertical is rotor shaft 18. The vertical rotor shaft 18 is aligned exactly with the center of the central rotating hub 22 for the electric energy generation.

Figure 2:
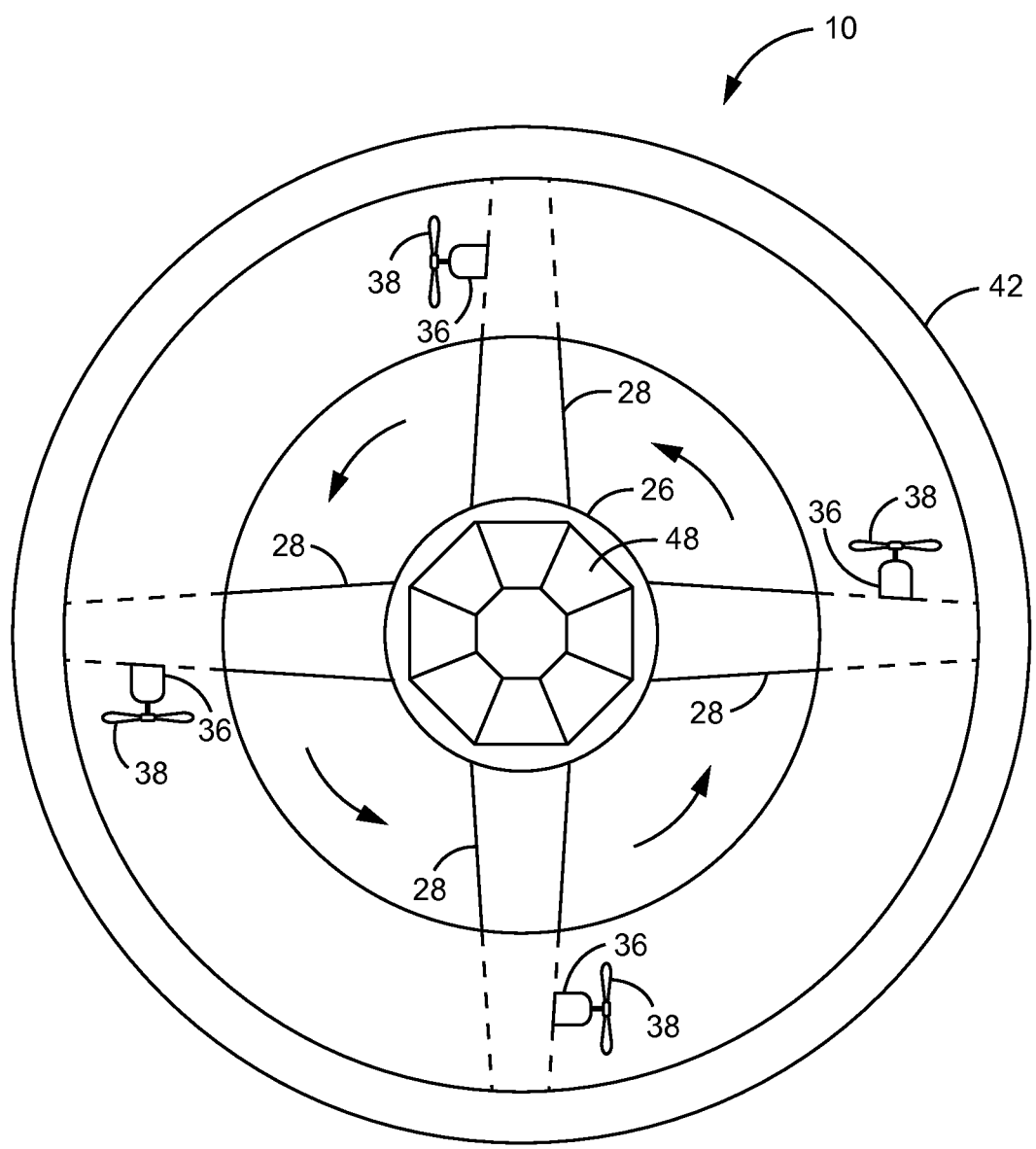
FIG. 2 is a top view of the electrical power generation system in accordance with the present invention.

FIG. 2 is a top view of the electrical power generation system 10. A high diameter rotating arm can be used for a high power vertical axis solar powered generator. The high power vertical axis solar powered generator may require a small sized solar energy collecting and converting unit as the solar energy collecting and converting unit is required to provide only the electric energy for a rotational movement of the electric motor 36. The circular shaped shroud 42 covers and provides protection for the electric motors 36, propellers 38, dual-V roller bearings 34, and pair of circular shaped hollow tubes 46 from the environment. Thus, the present system 10 adds safety to the design, keeps the electric motors 36 cool, and the surrounding clean. Further, the absence of tower in the present invention reduces the cost of construction and makes no danger to birds as the propellers 38 are enclosed in the circular shaped shroud 42.

Figure 3:
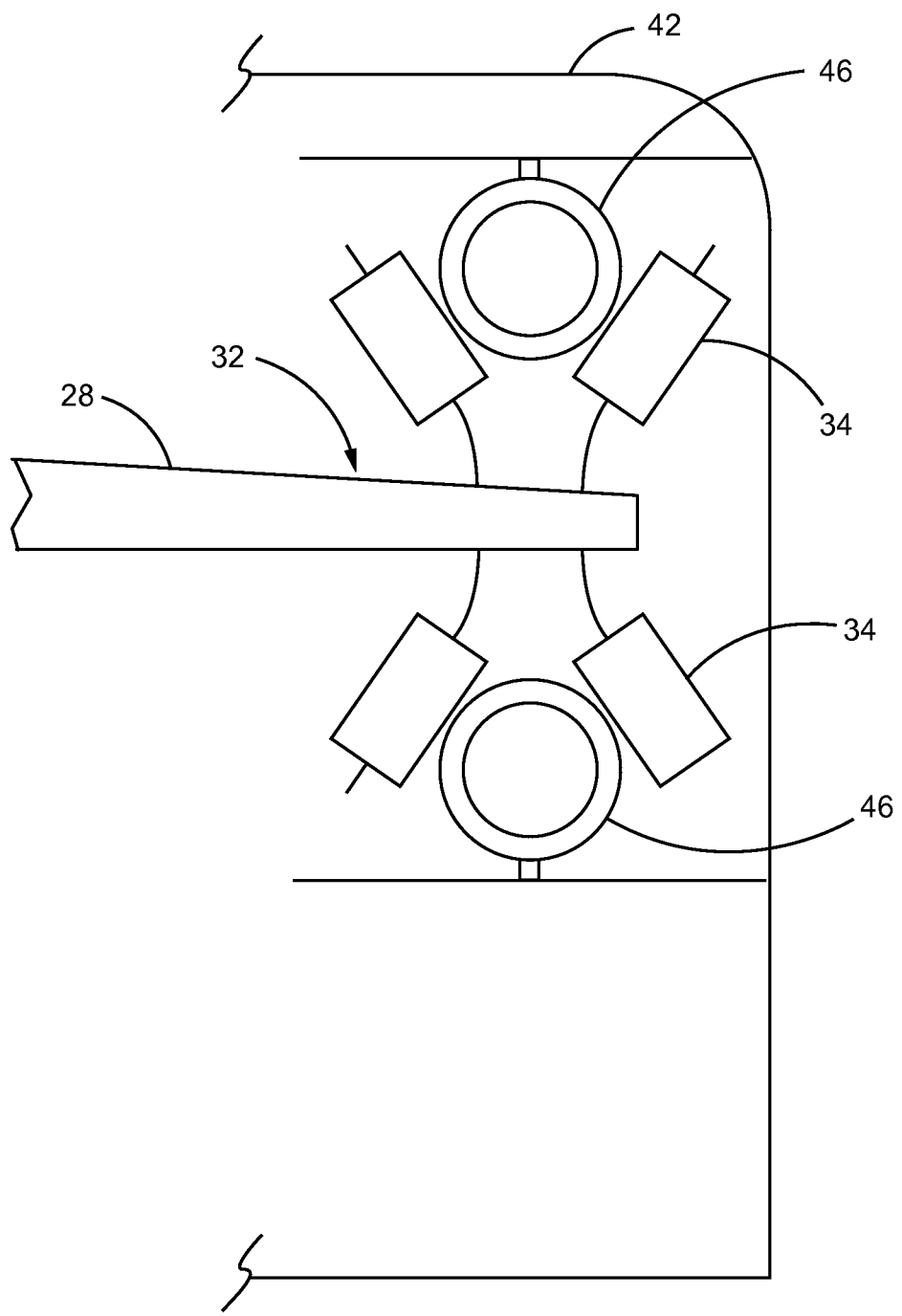
FIG. 3 is an enlarged cut away view of the shroud of the present invention.

In the present invention, the at least one dual-V roller bearing 34 rides on the pair of circular shaped hollow tubes 46 as shown in FIG. 3. Thus, the pair of circular shaped hollow tubes 46 provides a support for the distal end of the plurality of rotating arms 32. Moreover, with the arrangement shown, smooth rotational movement of the plurality of rotating arms 28 can be achieved and load on the plurality of rotating arms 28 can be reduced.

Figure 4:
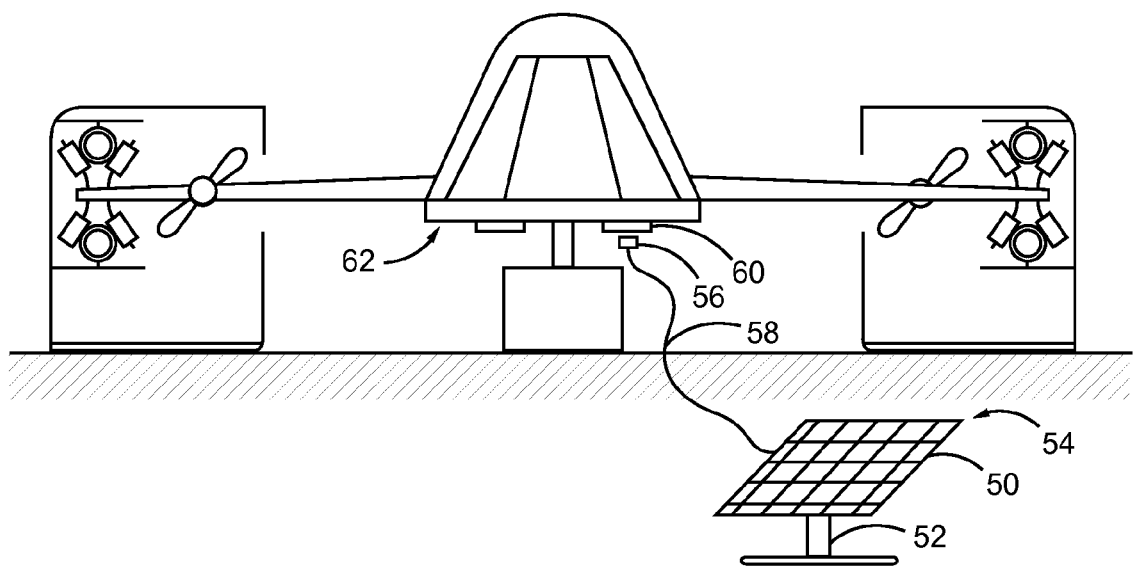
FIG. 4 is a side elevational view of another embodiment of the present invention showing a solar energy collecting and converting unit mounted on a stationary pole wherein the shroud is partially shown.

FIG. 4 is another embodiment showing a solar energy collecting and converting unit 50 is mounted on a stationary pole attached to the ground 52 at a tilted position 54. The electrical energy output from the solar energy collecting and converting unit 50 may be transferred to an electric brush 56 by means of a wire 58. Further, the electrical energy may be transferred to an annular ring 60 made of an electrically conductive material which is mounted on a bottom side of the central rotating hub 62.

Figure 5:
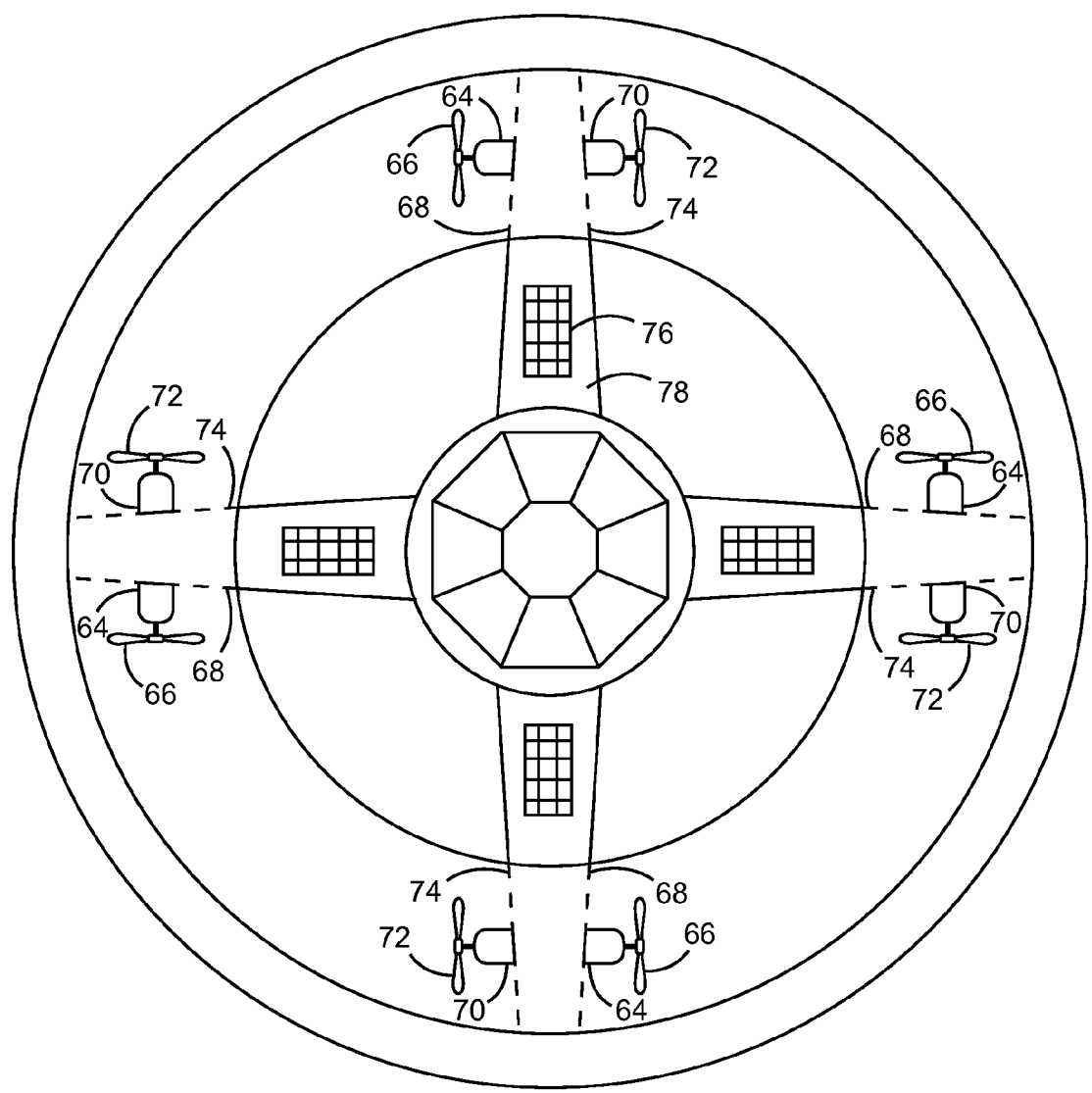
FIG. 5 is a top view of still another embodiment of the present invention showing a puller propeller and a pusher propeller.

FIG. 5 is a top view of still another embodiment of the present invention. An electric motor 64 with a puller propeller 66 may be mounted on a forward side of each of the plurality of rotating arms proximate to the distal end 68 thereof and an electric motor 70 with a pusher propeller 72 may be mounted on an aft side of each of the plurality of rotating arms proximate to the distal end 74 thereof. A solar energy collecting and converting unit 76 may be mounted on a top side of each of the plurality of rotating arms 78 for high power generation. Yet another embodiment of the present invention may include the solar energy collecting and converting unit 50 mounted on the stationary pole or an element that stabilizes the unit, attached to the ground 52 and the solar energy collecting and converting unit 76 mounted on the top side of each of the plurality of rotating arms 78.

While a particular form of the invention has been illustrated and described, it will be apparent that various modifications can be made without departing from the spirit and scope of the invention. Accordingly, it is not intended that the invention be limited, except as by the appended claims.

What is claimed is:

1. An electrical power generation system, comprising:
a vertical axis solar powered generator having a bottom side grounded and a top side connected to a vertical rotor shaft;
a central rotating hub in the shape of a circular flat plate having a center connected to the vertical rotor shaft;
at least one solar energy collecting and converting unit enclosed in a transparent dome mounted on a top side of the central rotating hub;
a plurality of rotating arms having a proximal end secured to the central rotating hub and a distal end connected to at least one dual-V roller bearing;
an electric motor with a propeller mounted proximate to the distal end of each of the plurality of rotating arms;
a circular shaped shroud attached to a ground; and a pair of circular shaped hollow tubes attached to the circular shaped shroud for providing guided support for the at least one dual-V roller bearing;

whereby the at least one solar energy collecting and converting unit provides an electric energy to the electric motor which may turn the propeller and rotate the plurality of rotating arms thereby causing the electric energy generation by the vertical axis solar powered generator.

2. The electrical power generation system of claim 1 wherein the at least one dual-V roller bearing rides on the pair of circular shaped hollow tubes thereby achieving smooth rotational movement of the plurality of rotating arms and load reduction on the plurality of rotating arms.

3. The electrical power generation system of claim 1 wherein the central rotating hub functions as a medium for transferring a torque from the plurality of rotating arms to the vertical rotor shaft.

4. The electrical power generation system of claim 1 wherein the vertical rotor shaft may be aligned exactly with the center of the central rotating hub for the electric energy generation.

5. The electrical power generation system of claim 1 wherein the transparent dome reduces the aerodynamic drag on the at least one solar energy collecting and converting unit due to the rotation of the central rotating hub.

6. The electrical power generation system of claim 1 wherein the at least one solar energy collecting and converting unit may comprise of a plurality of solar panels.

7. The electrical power generation system of claim 6 wherein the plurality of solar panels may be tilted for optimum solar energy collection.

8. The electrical power generation system of claim 1 wherein a high diameter rotating arm may be used for a high power vertical axis solar powered generator.

9. The electrical power generation system of claim 8 wherein the high power vertical axis solar powered generator may require a small sized solar energy collecting and converting unit as the solar panel is required to provide only the electric energy for a rotational movement of the electric motor.

10. The electrical power generation system of claim 1 wherein the circular shaped shroud covers and provides protection for the electric motors, propellers, dual-V roller bearings, and pair of circular shaped hollow tubes.

* * * * *